United States Patent [19]

Ball et al.

[11] Patent Number: 4,964,368

[45] Date of Patent: Oct. 23, 1990

[54] MILDING TEAT CUP HAVING EXTENDED LINER-SHELL SEAL

[75] Inventors: Robert C. Ball, Cambria, Wis.; Paul G. German, Bridgman, Mich.

[73] Assignee: Versa Medical Technologies, Inc., Portage, Wis.

[21] Appl. No.: 415,072

[22] Filed: Sep. 29, 1989

[51] Int. Cl.⁵ .............................................. A01J 5/04
[52] U.S. Cl. ................................ 119/14.49; 119/14.53
[58] Field of Search ............... 119/14.47, 14.48, 14.49, 119/14.50, 14.52, 14.53

[56] References Cited

U.S. PATENT DOCUMENTS

| | | |
|---|---|---|
| 1,045,991 | 12/1912 | Lindstrum . |
| 1,239,923 | 9/1917 | Leitch . |
| 1,287,404 | 12/1918 | Eklundh et al. . |
| 1,366,205 | 1/1921 | Moldenhauer . |
| 1,620,916 | 3/1927 | Pessell ............................ 119/14.49 |
| 1,959,581 | 10/1931 | Hapgood . |
| 2,007,162 | 3/1932 | Hapgood . |
| 2,061,809 | 4/1935 | Scott . |
| 2,219,945 | 2/1939 | Scott . |
| 2,300,833 | 11/1942 | Scott . |
| 2,323,851 | 7/1943 | Scott . |
| 2,502,956 | 4/1950 | Jansson . |
| 2,669,966 | 2/1954 | Sketl ................................ 119/14.49 |
| 2,986,117 | 5/1959 | Ronaldson . |
| 3,104,647 | 9/1963 | Rackleff . |
| 3,308,788 | 3/1967 | Noorlander . |
| 3,661,120 | 5/1972 | Siddall et al. . |
| 3,696,790 | 10/1972 | Albright .......................... 119/14.47 |
| 4,059,070 | 11/1977 | Siddall et al. . |
| 4,116,165 | 9/1978 | Arrington . |
| 4,269,143 | 5/1981 | Erbach ............................ 119/14.49 |
| 4,280,446 | 7/1981 | Noorlander ..................... 119/14.49 |
| 4,324,201 | 4/1982 | Larson ............................. 119/14.51 |
| 4,332,215 | 6/1982 | Larson ............................. 119/14.49 |
| 4,352,234 | 10/1982 | Noorlander . |
| 4,372,250 | 2/1983 | Larson ............................. 119/14.47 |
| 4,459,938 | 7/1984 | Noorlander ..................... 119/14.49 |
| 4,530,307 | 7/1985 | Thompson ...................... 119/14.49 |
| 4,604,969 | 8/1986 | Larson ............................. 119/14.49 |
| 4,651,676 | 3/1987 | Kupres ............................ 119/14.47 |
| 4,745,881 | 5/1988 | Larson . |
| 4,756,275 | 7/1988 | Larson . |

FOREIGN PATENT DOCUMENTS

| | | |
|---|---|---|
| 235060 | 5/1962 | Australia . |
| 528965 | 6/1954 | Belgium ......................... 119/14.47 |
| 548537 | 4/1932 | Fed. Rep. of Germany . |
| 593525 | 2/1934 | Fed. Rep. of Germany ... 119/14.53 |
| 82963 | 1/1954 | Switzerland . |
| 1230556 | 5/1986 | U.S.S.R. .......................... 119/14.47 |
| 277524 | 9/1927 | United Kingdom ............. 119/14.53 |
| 402663 | 12/1933 | United Kingdom ............. 119/14.53 |
| 603176 | 7/1948 | United Kingdom . |
| 1197747 | 7/1968 | United Kingdom . |

OTHER PUBLICATIONS

A Preliminary Study on Silicone Teatcup Liners, New England Journal of Dairy Science and Technology, pp. 238-241, 1977.

*Primary Examiner*—Paul J. Hirsch
*Attorney, Agent, or Firm*—Todd S. Parkhurst

[57] ABSTRACT

A teat cup assembly with a silicone liner is disclosed. The assembly provides a fluid seal for the liner at its proximal end. The flexible liner is folded around an extension bushing and centered within a milk collection funnel by spacing means to form a fluid seal.

11 Claims, 2 Drawing Sheets

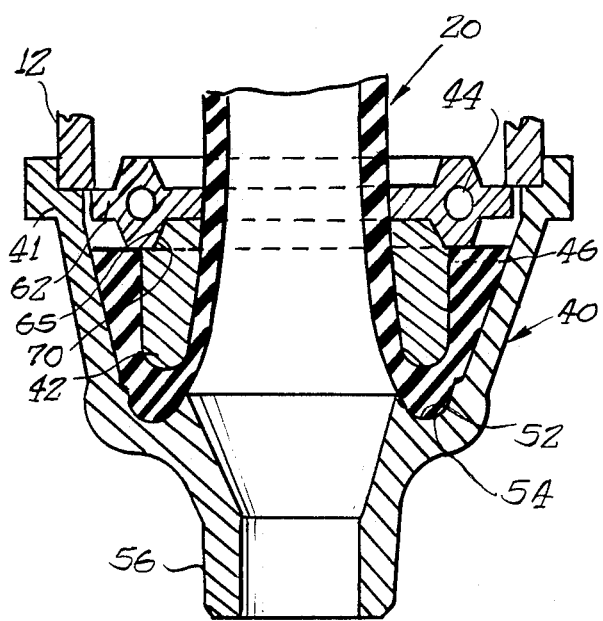
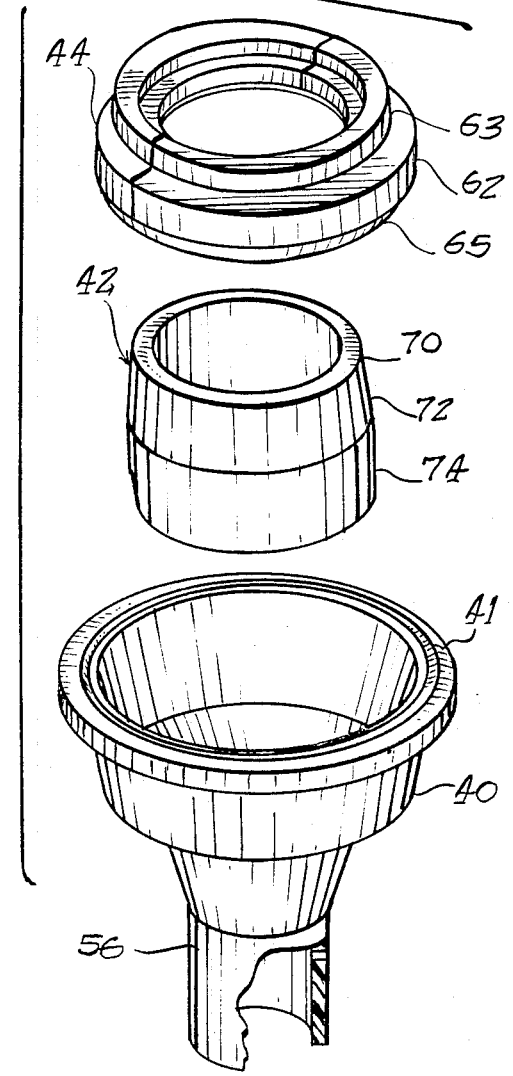
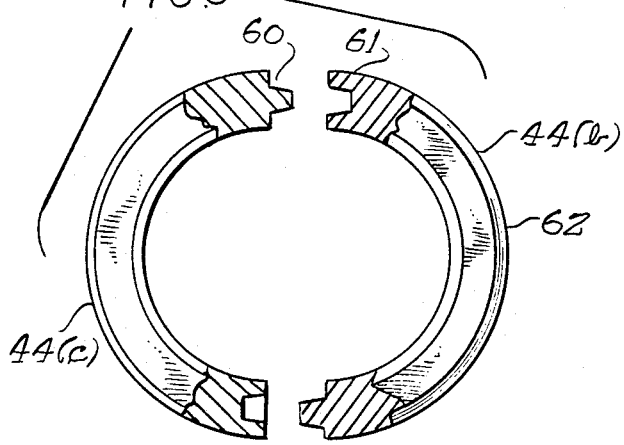

MILKING TEAT CUP HAVING EXTENDED LINER-SHELL SEAL

FIELD OF THE INVENTION

This invention relates generally to teat cup assemblies employing a flexible, resilient inflation or liner and, more particularly, relates to a teat cup assembly having a structure for securing the distal end of a cup inflation liner in a fluid sealing position within the teat cup assembly and shell.

BACKGROUND OF THE INVENTION

Milking equipment employing vacuum milker cups is used extensively in dairy operations in the U.S. Many milking systems include a relatively hard or rigid outer shell within which is mounted a flexible, resilient inflation or liner. Fluctuating pressures are applied to the annular region between the inside of the shell and outer surface of the liner, so as to cause a pulsing, milking motion of the liner. A vacuum is applied to a proximal end of the liner to draw off milk from the tubular region inside the liner. The milk is drawn through tubing to a centralized collecting vessel.

For many years, the inflation or liner has been made of natural or synthetic rubber. In at least one such shell and liner arrangement, the inflation or liner is stretched over a top bead of a teat cup shell, pulled through the shell and turned up at the proximal end which has a reduced diameter neck and bead. The turned up liner is held in place by the expanded head of a milk tube. Conventional teat cup assemblies with liners upturned at their proximal ends are illustrated in U.S. Pat. Nos. 1,239,923; 1,959,581; 2,061,809; 2,219,945; 2,300,833 and 2,323,851.

Inflations or liners made of silicone rather than natural or synthetic rubber have a number of advantages. Silicone inflations or liners do not absorb butter fat and oils or moisture as do rubber liners. Silicone inflations resist extremes of temperatures, are flexible even at low temperatures and resist deterioration due to sunlight, oils, solids and other chemicals and can be used for extensive periods of time. One arrangement for using a silicone inflation or liner in the milking teat cup shell is disclosed in U.S. Pat. No. 4,651,676. The patent is directed to an improved shell involving an enlarged and extended cylindrical shell wall for protecting the distal end of the silicone liner.

Nevertheless, silicone liners must be replaced periodically. One effective system for making this replacement is to replace the entire liner and shell unit with a new liner and shell unit. It is contemplated that the replacement unit will have been properly assembled and tested for effectiveness before it is acquired and installed by the milking system operator.

Accordingly, it is an object of this invention to provide a teat cup assembly including a silicone inflation or liner that can be easily assembled into the shell so as to effectively and reliably maintain the necessary end fluid-tight seal between the inflation and the shell.

Another object is to provide a shell-inflation attachment and seal arrangement which will seal effectively for a long time.

Other objects and advantages of the invention will become apparent upon reading the following detailed description and upon reference to the drawings.

Throughout the drawings, like reference numerals refer to like parts.

SUMMARY OF THE INVENTION

The present invention relates to a teat cup assembly for use in an automatic milking system. The assembly comprises a shell having a teat-receiving distal end and a milk-delivery proximal end; a flexible inflation is joined to the shell at the proximal and distal ends of the assembly with a fluid sealing fit. The proximal or milk-delivery end of the assembly has a collection funnel, and an extension bushing is adapted to engage and retain the proximal end of the inflation in the collection funnel with a fluid sealing fit. A spacer means engages and centers the extension bushing and inflation in the funnel, and engages the shell so as to axially distend and secure the inflation between the bushing and collection funnel. Further, the present invention relates to a method of assembling the teat cup assembly.

DESCRIPTION OF THE DRAWINGS

FIG. 3 is a fragmentary sectional view similar to the lower portion of FIG. 1 but showing parts of the invention in further detail;

FIG. 4 is an exploded view showing parts of the invention in still further detail; and FIG. 5 is an exploded and partially sectional view showing the shape and inter-arrangement of split ring members forming part of the present invention.

DETAILED DESCRIPTION

While the invention will be described in connection with a preferred embodiment and procedure, it will be understood that it is not intended to limit the invention to this embodiment and procedure. On the contrary, it is intended to cover all alternatives, modifications and equivalents as may be included within the spirit and scope of the invention.

Figure 1:
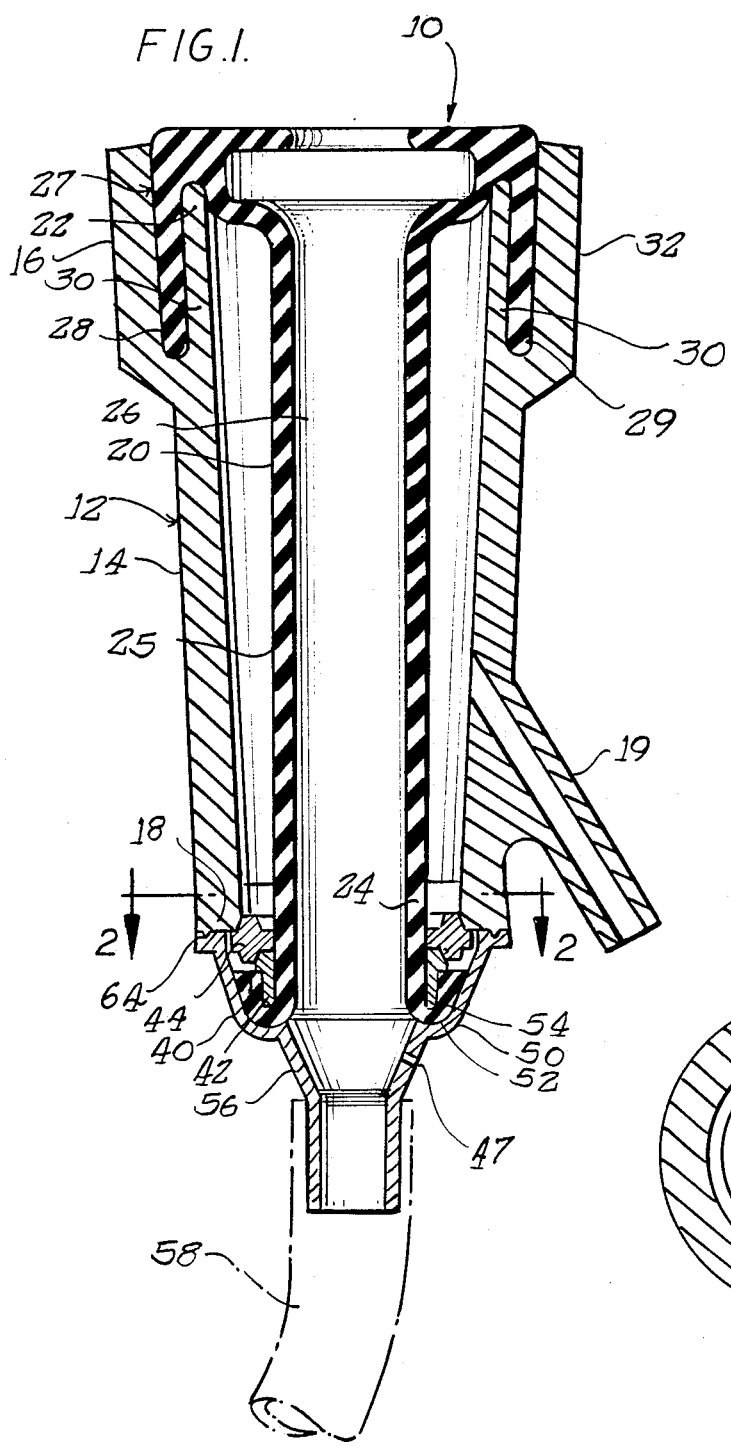
FIG. 1 is a sectional view of the teat cup assembly of the present invention.
Figure 2:
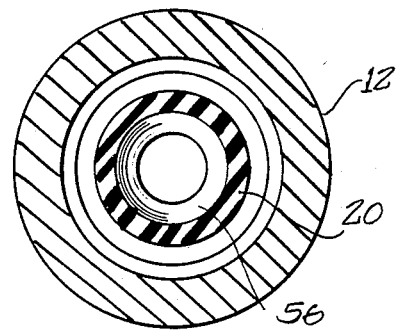
FIG. 2 is a sectional view taken substantially in the plane of line 2—2 of FIG. 1.

Referring to FIGS. 1 and 2, a teat cup assembly in accordance with the present invention is designated generally by reference number 10. The teat cup assembly 10 includes an outer shell 12 which has a cylindrical, slightly tapered, frusto-conical wall portion 14 terminating in a distal end 16 and a proximal end 18. The shell 12 also includes an integrally formed small diameter tube 19 which is connected to a source of pulsating vacuum as are conventional teat cup assemblies.

The shell 12 can be formed preferably by injection molding with a suitable plastic. While the use of any suitable plastic is contemplated, nylon plastic or any similar material having a good degree of impact resistance and compression strength is particularly suited for the present device. A mineral filled type 6 nylon useful for this purpose is offered by the Allied Chemical Company of Morristown, N.J.

A flexible, resilient inflation or liner 20 is installed within the shell 12. The flexible resilient inflation or liner 20 is made from silicone rubber. Silicone rubber sold under the tradename SilPlus is available from the General Electric Company of New York.

The inflation liner 20 has a distal end 22 and proximal end 24. The inflation or liner 20 includes a generally cylindrical mediate wall portion 25 which forms a teat-receiving chamber 26. A cuff 27 includes an outwardly spaced annular flange 28 extending downwardly to fit within an annular slot or relief 29 formed between adjacent walls 30 and 32 of the shell 12. A wall 32 is generally flared outwardly and projects beyond the distal end 16 of the shell in an axial direction. The cuff 27 is fitted into the annular slot 29 to prevent twisting of the distal end 22 of the liner, and to provide a good liner-shell distal end seal.

An effective arrangement for attaching the proximal end 24 of the liner 20 to the proximal end 18 of the outer shell 12 is also provided. In accordance with one aspect of the invention, a collection cap funnel 40, within which is arranged an extension bushing 42, is adapted to engage and retain the proximal end 24 of inflation 20 in the collector funnel 40 with a fluid seal fit. The proximal end 24 of the inflation 20 is arranged, in its finally-assembled configuration, to be generally U-shaped. Spacing means 44 engages and centers the extension bushing 42 in the cap funnel 40, and also engages the shell proximal end 18 so as to axially distend and secure the inflation 20 in the assembled shell 10 and collection cap funnel 40. An expanded or thickened wedge-like liner foot 46 is crimped into the fixed retaining position shown in FIGS. 1 and 3.

If desired, a small vent hole 47 (FIG. 1) may be provided to admit air at the general junction of the teacup 10 and milk tube 58 so as to encourage easy milk flow to downstream portions of the milking system.

As also shown in FIGS. 1 and 3, the preferred fluid seal arrangement between inflation 20 and cap funnel 40 is provided by forming a mediate portion 50 of the cap funnel 40 with an annular trough-like inner surface 52 adapted to closely mate with and engage over an extended surface area, the curved outer surface 54 of the turned inflation proximal end 24. The trough surface 52 terminates in rings 53 and 55 (See FIG. 3) shaped to firmly engage and compress the liner 20 so as to enhance the fluid-tight seal. An extension 56 of funnel 40 can be adapted for a fluid-tight sealing connection with a standard hose 58 to provide a fluid path for milk to a source of constant vacuum.

Spacing means 44 comprises an annular device with semicircular split ring members 44(b) and 44(c). The split ring members are joined by inserting a locator tongue 60 into a receiving slot 61 for a secure fit.

Around the periphery of the joined ring member 44(b) and 44(c) is an annular extension 62 which engages the top portion 41 of funnel 40. The upper portion 63 of spacing means 44 engages the lower end surface 64 of shell 12. The lower portion 65 of spacing means 44 engages the tapered upper portion 70 of bushing 42. The spacing means 44 helps to center the bushing and inflation in the collection cap funnel 40 with a press interference fit to insure a fluid seal fit.

Assembly of the shell and liner is easy to accomplish. The silicone liner 20 is inserted into the top of shell 12 and pulled through to the proximal end 18 of the shell. As shown in FIG. 3, the wedge-like foot 46 and bottom end 24 of the liner 20 are turned around or folded over bushing 42. Next, semi-circular split ring members 44(b) and 44(c) are placed around the liner above bushing 42 and joined to from spacing means 44. Cap funnel 40 may then be securely joined to the proximal end 18 of shell 12 by sonic welding or other suitable means.

In operation, a pulsating vacuum is applied through pipe 19. Constant vacuum is applied through hose 58 to draw milk from the teat through chamber 26 after the teat cup assembly is in place. Bushing 42 secures the foot 46 and outer surface 54 of the proximal end 24 of inflation 20 against the annular inner surface 52 of funnel 40. Annular spacing means 44 engages the bushing 42 to prevent upward movement of the bushing for securely holding inflation 20 in place. Milk is pumped through hose 58 to a milking machine collection vessel.

What is claimed is:

1. A teat cup assembly for use in an automatic milking system, a teat cup assembly having proximal and distal ends including
    a shell having a teat receiving distal end and a proximal end, and
    a flexible inflation adapted to be joined at its proximal and distal ends to the assembly with fluid seal fits,
    the assembly at its proximal end comprising
    a collection cap funnel,
    an extension bushing adapted to engage and retain the proximal end of the inflation in the collection funnel with a fluid seal fit, and
    spacing means for engaging and centering the extension bushing and inflation in the funnel and for engaging the shell so as to axially distend and secure the inflation between the extension bushing and collector funnel.
2. A teat cup assembly according to claim 1 wherein the spacing means includes two semi-circular split ring members each adapted to engage the other member.
3. A teat cup assembly according to claim 2 wherein the split ring spacing means is provided with an annular extension for engaging the cap funnel.
4. A teat cup assembly according to claim 3 wherein the lower portion of the split ring spacing means is adapted to receive a mating end of the extension bushing.
5. A teat cup assembly according to claim 3 wherein the upper portion of the split ring spacing means is adapted to engage a lower end of the shell.
6. A teat cup assembly according to claim 1 wherein the extension bushing defines an upper portion, and a lower portion adapted to engage the inflation when the inflation end is turned back over the bushing.
7. A teat cup assembly according to claim 6 wherein the upper portion of the bushing engages the spacing means.
8. A teat cup assembly according to claim 1 wherein the flexible inflation is made from silicone rubber.
9. A teat cup assembly according to claim 10 wherein the proximal end of the inflation is formed with a wedge-like foot to assist in retaining the inflation in a distended condition in the assembly.
10. A method of assembling a teat cup for use in an automatic milking system comprising
    inserting an inflation with a top and bottom portion in the top portion of a teat cup,
    pulling the inflation through the teat cup to the bottom portion of the teat cup,
    securing the top portion of the inflation to the top portion of the teat cup,
    positioning bushing means around the outside surface of the bottom portion of the inflation,
    reversely turning the inflation over the bushing means,
    placing spacing means around the inflation above the bushing, and
    fastening a cap funnel around the bushing means, inflation and split ring spacing means to engage the shell.
11. A method of assembling a teat cup according to claim 10 wherein the step of securing the inflation on the bushing means includes the step of wedging a proximal end of the liner between the bushing and the cap funnel.

* * * * *